US006765521B2

(12) United States Patent
Preis et al.

(10) Patent No.: US 6,765,521 B2
(45) Date of Patent: Jul. 20, 2004

(54) DECODING DEVICE AND SMART CARD HAVING SUCH A DECODING DEVICE

(75) Inventors: Viktor Preis, Taufkirchen (DE); Martin Häring, San Jose, CA (US); Christian Schneckenburger, Höhenkirchen (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/253,448

(22) Filed: Sep. 24, 2002

(65) Prior Publication Data

US 2003/0071130 A1 Apr. 17, 2003

Related U.S. Application Data

(63) Continuation of application No. PCT/DE01/01130, filed on Mar. 23, 2001.

(30) Foreign Application Priority Data

Mar. 24, 2000 (EP) .......................................... 00 106 642

(51) Int. Cl.[7] .............................................. H03M 1/00
(52) U.S. Cl. ...................................... 341/155; 375/340
(58) Field of Search ................. 714/709, 812, 714/817; 375/320, 340; 369/59.17, 59.18, 59.19, 59.2, 59.21; 341/155

(56) References Cited

U.S. PATENT DOCUMENTS

| 5,796,693 | A | | 8/1998 | Taguchi et al. | |
|---|---|---|---|---|---|
| 5,905,761 | A | * | 5/1999 | Je et al. | 375/320 |
| 6,310,926 | B1 | * | 10/2001 | Tore | 375/355 |
| 2001/0033197 | A1 | * | 10/2001 | Nebel et al. | 329/311 |
| 2002/0037062 | A1 | * | 3/2002 | Riess et al. | 375/348 |
| 2002/0094039 | A1 | * | 7/2002 | Starr et al. | 375/340 |

FOREIGN PATENT DOCUMENTS

| EP | 0 600 556 A1 | 6/1994 |
|---|---|---|
| EP | 0 892 358 A2 | 1/1999 |

* cited by examiner

Primary Examiner—Howard L. Williams
(74) Attorney, Agent, or Firm—Laurence A. Greenberg; Werner H. Stemer; Ralph E. Locher

(57) ABSTRACT

A decoding device includes a signal-conditioning device for generating an intermediate signal from an input signal, a data register for storing a time section of the intermediate signal and a bit decoder for converting the intermediate signal into an output signal having at least one bit. The decoding device also includes a pattern recognition device. The decoding device enables even severely disturbed signals to be reliably detected and correctly decoded. Simple adaptation of the decoding device to various uses is possible. A smart card including the decoding device is also provided.

8 Claims, 2 Drawing Sheets

DECODING DEVICE AND SMART CARD HAVING SUCH A DECODING DEVICE

CROSS-REFERENCE TO RELATED APPLICATION

This application is a continuation of copending International Application No. PCT/DE01/01130, filed Mar. 23, 2001, which designated the United States and was not published in English.

BACKGROUND OF THE INVENTION

FIELD OF THE INVENTION

The invention relates to a decoding device for decoding a transmitted signal. The invention also relates to smart card systems having such a decoding device.

Decoding devices are used when a signal transmitted on a sub-carrier has to be decoded into a binary code. However, a problem with using them is that the received signal generally differs considerably from the ideal signal. The differences are manifested in noise spikes, changes in pulse length and signal drifts. The causes of the differences lie in the smart card systems, the signal quality of the smart cards and the quality of the analog part. The distance from the smart card to a reading device and the sensitivity of the receiving apparatus also influence the signal form. The faults must be filtered out for error-free decoding.

Conventional decoding devices are based on analog signal processing. Low-pass filters and Schmitt triggers are used to filter out a stable signal. However, those decoding devices are relatively costly for achieving reliable decoding. In addition, all the faults (occurring in the transmitted signal) cannot be detected and/or corrected. Furthermore, those decoders are inflexible if the coding and the transmission system are to be varied.

SUMMARY OF THE INVENTION

It is accordingly an object of the invention to provide a decoding device and a smart card having such a decoding device that overcome the hereinafore-mentioned disadvantages of the heretofore-known devices of this general type, that enable reliable decoding of a signal and that are flexible in application.

With the foregoing and other objects in view, there is provided, in accordance with the invention, a decoding device having a signal-conditioning device that generates an intermediate signal (from an analog input signal) for digital processing and a data register for accepting a time section of the intermediate signal. A bit decoder for converting the time section of the intermediate signal stored in the data register to an output signal having one bit, and a pattern recognition device that works together with the bit decoder are also provided.

In accordance with another feature of the invention, the signal-conditioning device includes a synchronization device having an output for outputting a digital signal. It also includes a sampling device (for sampling the digital signal) having an output for outputting the intermediate signal.

An analog signal is processed in the signal-conditioning device until an intermediate signal enabling digital processing is available at the output. Noise spikes are detected and suppressed, which advantageously takes place during synchronization. In addition, pulse lengths are corrected and a frequency drift of the data stream is detected and compensated for. This is done in the sampling device.

In accordance with a further feature of the invention, the signal-conditioning device includes a fault detector.

In accordance with an added feature of the invention, the signal-conditioning device has a fault corrector.

In accordance with an additional feature of the invention, the pattern recognition device works on a rule basis.

In accordance with yet another feature of the invention, the pattern recognition device has parameters to be changed.

In accordance with yet a further feature of the invention, the parameters of the signal-conditioning device can be changed by software.

With the objects of the invention in view, there is also provided a smart card having such a decoding device including a signal-conditioning device for generating an intermediate signal from an analog input signal for digital processing. The decoding device includes a data register coupled to the signal-conditioning device for storing a time section of the intermediate signal, a bit decoder coupled to the data register for converting the time section of the intermediate signal stored in the data register into an output signal having one bit, and a pattern recognition device coupled to the bit decoder.

In accordance with a concomitant feature of the invention, there is provided a reading device having a decoding device.

Further, the intermediate signal is stored in sections in the data register. The bit decoder decodes the section of the intermediate signal stored in the data register into one or more bits. The bit decoder works with a pattern recognition device for decoding. Thus, even faulty or incompletely transmitted signal sections can be detected. This is one of the advantages, since the costs of signal conditioning and configuration of transmission links can be limited.

Other features that are considered as characteristic for the invention are set forth in the appended claims.

Although the invention is illustrated and described herein as embodied in a decoding device and a smart card having such a decoding device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
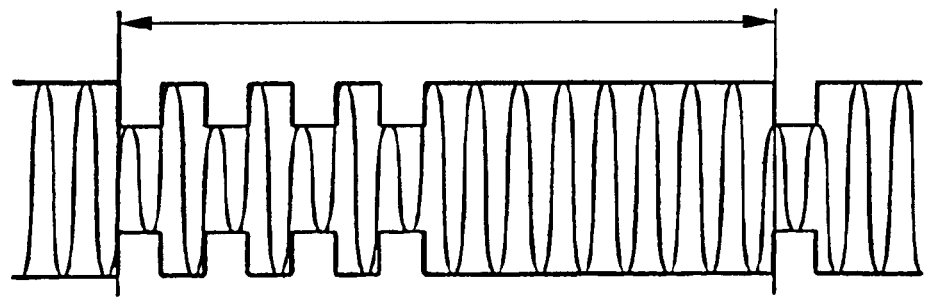
FIG. 1A is a signal diagram of an ASK-modulated signal (input signal)
FIG. 1B is a signal diagram of a demodulated signal of the input signal of FIG. 1A.
Figure 1:
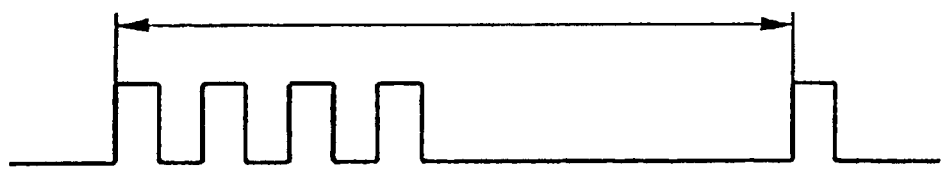
Figure 2:
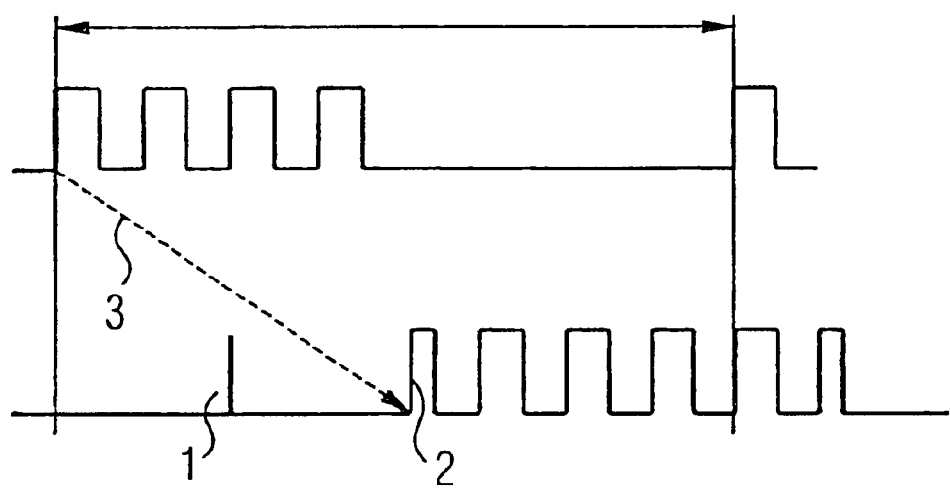
FIG. 2 is a signal diagram illustrating faults in a flow of the signal of FIG. 1B.

Referring now to the figures of the drawings in detail and first, particularly to FIGS. 1A, 1B and 2 thereof, there are shown typical signal flows involved with using contactless smart cards. In a transmitting system, an information item is coded into a data sequence. It is subsequently modulated and transmitted. A possible digital modulation method is "ASK procedure". In the procedure, the amplitude of a carrier is varied according to the data sequence. A first amplitude is assigned a logical zero and a second amplitude is assigned a logical one.

FIG. 1A shows such a modulated signal. After separation from the carrier signal (i.e., demodulation), the digital data sequence is again available as shown in FIG. 1B. FIG. 1B shows the demodulated signal in the ideal form. However, the recovered signal does not usually correspond to the ideal form. Tolerances in the transmitter and the receiver, and faults on the transmission link, often change the signal so much that decoding of the data sequence is only possible with faults (if at all). The sections of FIGS. 1A and 1B correspond (in each case) to one uncoded bit.

FIG. 2 shows possible faults in the transmitted signal. The ideal signal from FIG. 1B is shown in the upper part of the diagram. A real signal can be seen in the lower part of the diagram, which further processes the signal (after the demodulation). The real signal indicates interference with a noise spike 1, a changed pulse width 2 and a signal shift 3. Thus, it is no longer clearly detectable when a signal section begins and which pulses of the signal sequence should be decoded.

Figure 3:
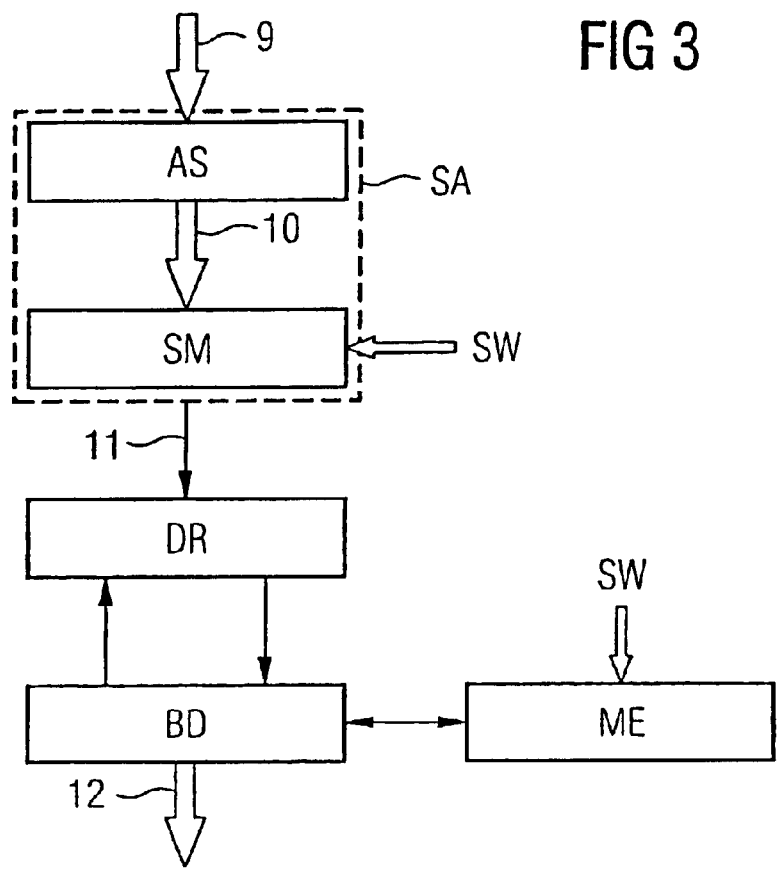
FIG. 3 is a block diagram of a decoding device according to the invention.

FIG. 3 represents one embodiment of a decoding device according to the invention. The first step in processing an input signal 9 involves converting the input signal 9 to a form suitable for digital processing. This is done in a signal-conditioning device SA.

The signal-conditioning device SA can be subdivided into two blocks, in the first block, (i.e., the synchronization device AS), the analog input signal 9 is converted to a digital signal 10. Dealing with a first part of the faults involves suppressing the noise spikes. In the second block (i.e., an "intelligent" sampling device SM), useful pulses of the digital signal are detected, while dealing with a second part of the faults. The data volume is reduced to a minimum, since only one bit is reproduced in the intermediate signal 11 for each pulse of the digital signal 10.

Thus, the faults (described with reference to FIG. 2) are at least partially detected and corrected in the signal-conditioning device SA. Appropriate monitoring can be provided in cases in which the signal is so severely disturbed that reliable detection is no longer possible. This prevents incorrect information being erroneously output.

Further, the parameters of the signal-conditioning device SA can be set. The signal-conditioning device SA detects the beginning and end of a section of the input signal 9, even if a time shift occurs (i.e., signal shift). Then, the section is stored as an intermediate signal 11 in a data register DR.

The bit decoder BD generates an output signal 12 from the intermediate signal stored in the data register. Therefore, it is necessary to identify which information corresponds to the data sequence stored in the data register. For this purpose, the bit decoder BD works together with a pattern recognition device ME. The parameters of the pattern recognition device ME can be selected by software.

In other words, the bit decoder is not dependent on having a high-quality signal available for analysis. Even disturbed signals with faulty data sequences can be reliably recognized with pattern recognition (by suitable masks or algorithms). The pattern recognition device ME considers a large time range. Therefore, the decoding is relatively tolerant to individual small faults. The output signal 12 may include one or more bits, depending on the coding or modulation method applied.

In an advantageous development, the pattern recognition device ME works on a rule basis. The recognition rules are again variable. The multiple setting options for parameters allow the decoding device to be flexibly matched with various applications and coding options. Matching with other transmission rates and frequencies is easily possible.

The data register DR serves as a standard interface between the signal-conditioning device SA and the bit decoder BD. Thus, for a change in the signal-conditioning device SA (e.g., to cope with other modulation types), there is no need for a corresponding change in the bit decoder BD, since it accesses only the data register DR. The converse is also true.

Figure 4:
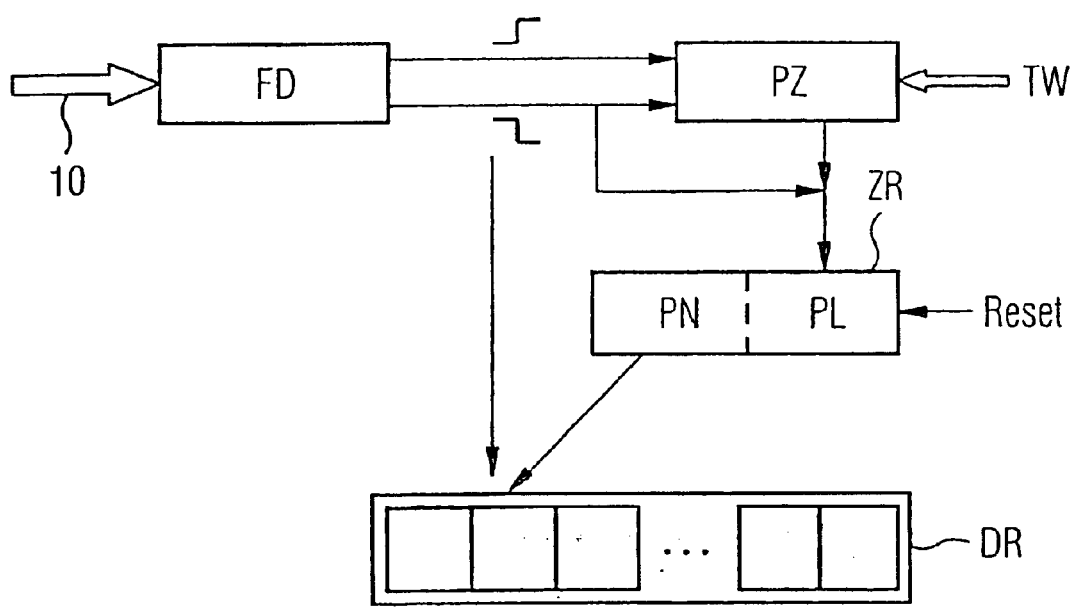
FIG. 4 is a block diagram of a signal-conditioning device of the decoding device of FIG. 3.

FIG. 4 illustrates an embodiment of the signal-conditioning device SA in detail. The input signal 9 is an ASK-modulated signal. The signal 9 is input as a digital signal 10 to a pulse edge detector FD. The pulse edge detector FD detects a trailing or a rising edge and generates corresponding signals to its outputs. The signals are input to the inputs of a pulse length counter PZ. The pulse length counter PZ evaluates the length of a pulse and detects whether this is a fault signal or a useful signal. The tolerance values TW, which mark the limits between useful and fault signals, can be variably preset. A one or a zero is generated as the output of the pulse length counter PZ, depending on whether the input signal is a logical one or a logical zero. At the time of the trailing edge of the digital signal 10, it is certain whether or not the pulse has the necessary minimum length to be regarded as a useful signal.

Therefore, the output signal of the pulse length counter PZ is evaluated for the trailing edge, and the value is stored in an intermediate register ZR. A pulse number PN (which forms the index) is automatically assigned for the position of the pulse within the data register DR. Since a valid signal may be present only when a trailing edge occurs again, the information about the occurrence of a trailing edge is forwarded to the data register DR.

Thus, it becomes possible to set the register position provided for this purpose in the data register DR when a logical one is passed from the intermediate register ZR. Otherwise, this is prevented, or else, an endless one in the digital signal 10 (attributable to a fault) would be entered in the data register DR as a detected one.

The pulse number PN is reset at the beginning of a new section of the digital signal 10. This allows the first register position in the data register DR to be set to a new value again.

The pulse edge detector FD may be replaced by a phase discriminator if a phase-modulated signal is used instead of an amplitude-modulated signal. However, the invention is not restricted to amplitude-modulated or phase-modulated signals.

The invention can be extended to all other digital modulation techniques.

What is claimed is:

1. A decoding device, comprising:
   a signal-conditioning device for generating an intermediate signal from an analog input signal for digital processing;
   a data register coupled to said signal-conditioning device for storing a time section of the intermediate signal;
   a bit decoder coupled to said data register for converting the time section of the intermediate signal stored in said data register into an output signal having at least one bit; and a pattern recognition device coupled to said bit decoder, said pattern recognition device operating on a rule basis.

2. The decoding device according to claim 1, wherein said signal-conditioning device includes a synchronization device having an output for outputting a digital signal and a sampling device for sampling the digital signal, and said sampling device has an output for outputting the intermediate signal.

3. The decoding device according to claim 1, wherein said signal-conditioning device includes a fault detector.

4. The decoding device according to claim 1, wherein said signal-conditioning device has a fault corrector.

5. The decoding device according to claim 1, wherein said pattern recognition device has parameters to be changed.

6. The decoding device according to claim 5, wherein the parameters are changed by software.

7. A smart card, comprising:
a decoding device including:
   a signal-conditioning device for generating an intermediate signal from an analog input signal for digital processing;
   a data register coupled to said signal-conditioning device for storing a time section of the intermediate signal;
   a bit decoder coupled to said data register for converting the time section of the intermediate signal stored in said data register into an output signal having at least one bit; and
   a pattern recognition device coupled to said bit decoder, said pattern recognition device operating on a rule basis.

8. The smart card according to claim 7, further comprising a reading device having said decoding device.

* * * * *